US009207314B1

United States Patent
Mookerjee et al.

(10) Patent No.: US 9,207,314 B1
(45) Date of Patent: Dec. 8, 2015

(54) RAPID DETERMINATION OF MODEL TRANSITIONS FOR INTERACTING MODELS WITH BOUNDED PARAMETERS

(75) Inventors: Purusottam Mookerjee, Bridgewater, NJ (US); Frank J. Reifler, Cinnaminson, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 724 days.

(21) Appl. No.: 13/528,216

(22) Filed: Jun. 20, 2012

(51) Int. Cl.
*G01S 13/00* (2006.01)
*G01S 13/72* (2006.01)
*G01S 7/00* (2006.01)

(52) U.S. Cl.
CPC .............. *G01S 13/726* (2013.01); *G01S 7/003* (2013.01); *G01S 13/723* (2013.01)

(58) Field of Classification Search
CPC ...... G01S 13/726; G01S 7/003; G01S 13/723
USPC ........................................... 342/90, 192, 195
See application file for complete search history.

(56) References Cited

U.S. PATENT DOCUMENTS

| | | | | |
|---|---|---|---|---|
| 5,325,098 A * | 6/1994 | Blair et al. | ........................ | 342/95 |
| 6,226,409 B1 * | 5/2001 | Cham et al. | .................... | 382/228 |
| 6,278,401 B1 * | 8/2001 | Wigren | ........................... | 342/195 |
| 7,009,554 B1 * | 3/2006 | Mookerjee et al. | ............ | 342/195 |
| 7,180,443 B1 | 2/2007 | Mookerjee et al. | | |
| 7,277,047 B1 | 10/2007 | Mookerjee et al. | | |
| 7,705,780 B1 * | 4/2010 | Khoury | .......................... | 342/377 |
| 7,719,461 B1 * | 5/2010 | Mookerjee et al. | ............ | 342/95 |
| 8,886,394 B2 * | 11/2014 | Noonan | ........................ | 701/30.3 |
| 2005/0128138 A1 * | 6/2005 | McCabe et al. | ............... | 342/195 |
| 2008/0120031 A1 * | 5/2008 | Rosenfeld et al. | ............. | 701/220 |
| 2009/0231183 A1 * | 9/2009 | Nettleton et al. | ............... | 342/95 |

OTHER PUBLICATIONS

Y. Bar-Shalom, M. Mallick, H. Chen, and R. Washburn, "One-Step Solution for the General Out-of-Sequence-Measurement Problem in Tracking," Proceedings of 2002 IEEE Aerospace Conference Proceedings, vol. 4, pp. 1551-1559, 2002.
G.J. Portmann, J.R. Moore, and W.G. Bath, "Separated Covariance Filtering," Record of the IEEE 1990 International Radar Conference, 1990, pp. 456-460.
Y. Bar-Shalom, "Update with Out-of-Sequence Measurements in Tracking: Exact Solution," IEEE Transactions on Aerospace and Electronic Systems, pp. 769-778, vol. AES-38, No. 3, Jul. 2002.
E. Mazor, A. Averbuch, Y. Bar-Shalom, and J. Dayan, "Interacting Multiple Model Methods in Target Tracking: A Survey," IEEE Transactions on Aerospace and Electronic Systems, 34, 1 (Jan. 1998), 103-123.

(Continued)

*Primary Examiner* — John B Sotomayor
*Assistant Examiner* — Marcus Windrich
(74) *Attorney, Agent, or Firm* — Howard IP Law Group, PC

(57) ABSTRACT

A state estimation system utilizing an Interacting Multiple Model (IMM) architecture and algorithms that can transition between different regimes of operation described by multiple models. Each individual model includes states, whose dynamics can be modeled, as well as extrinsic parameters, such as inputs to the system and sensor biases, whose dynamics cannot be modeled, but which are constrained to lie within a known range of values.

16 Claims, 3 Drawing Sheets

(56) References Cited

OTHER PUBLICATIONS

W.D. Blair and Y. Bar-Shalom, "Tracking Maneuvering Targets with Multiple Sensors: Does More Data Always Mean Better Estimates?" IEEE Transactions on Aerospace and Electronic Systems, pp. 450-456, vol. AES-32, No. 1, Jan. 1996.

X.R. Li and V.P. Jilkov, "Survey of Maneuvering Target Tracking—Part V: Multiple-Model Methods," IEEE Transactions on Aerospace and Electronic Systems, 41, 4 (Oct. 2005), 1255-1321.

* cited by examiner

RAPID DETERMINATION OF MODEL TRANSITIONS FOR INTERACTING MODELS WITH BOUNDED PARAMETERS

STATEMENT OF GOVERNMENT INTEREST

This invention was made with Government support under Contract N00024-03-C-6110 awarded by the Department of the Navy. The Government has certain rights in this invention.

FIELD OF THE INVENTION

The present invention relates generally to state estimation of systems, and more particularly, to state estimation of systems undergoing transitions between multiple state models.

BACKGROUND

Consistent and accurate methods for performing state estimation in a wide-variety of systems are critical to the function of many processes and operations, both civilian and military. Systems and methods have been developed for state estimation of a system that may transition between different regimes of operation which may be described or defined by a plurality of discrete models. These state estimation methods can be applied to various systems having sensory inputs, by way of non-limiting example only, nuclear, chemical, or manufacturing factories or facilities, control processes subject to external parameter changes, space stations subject to vibrations, automobiles subject to road conditions, and the like. One particularly useful application for state estimation is tracking objects in flight, such as a multistage rocket that is transitioning back and forth between a ballistic model of flight and other thrust models, or an aircraft performing maneuvers mid-flight.

As will be set forth in greater detail below, current state estimation systems and their associated algorithms have difficulty estimating the state of a system transitioning between distinct regimes of operation (i.e. between different, non-interacting models). More recent algorithms may implement "interacting models", including Interacting Multiple Models (IMM), which allow for transitioning from one model to another during the estimation process. These interacting model algorithms have the advantage of reducing the filter lag and/or noise when the system transitions from one model to another. However, they are often burdened by computational challenges. Likewise, existing IMM-based estimators and their associated filtering arrangements also suffer from significant drawbacks, as their designs typically require large amounts of simulation, making their implementation impractical.

Improved systems and methods for state estimation are desired.

SUMMARY

A method for estimating the state of an object is provided. The method includes providing a plurality of interacting models, wherein each model represents a potential operating state of said object. The models are defined by at least one parameter constrained to lie within a predetermined range of values. Measurements of the state of the object are made, from which model-conditioned estimates of the object state are generated. A model probability is updated from the model-conditioned estimates and overall estimates of the object state and associated covariance are generated. The states of the models are mixed in response to the model probabilities and the overall estimate of the state and covariance, and an updated estimate of the state and covariance of the object is generated.

A system for estimating the state of an object is also provided. The system includes a sensor for measuring at least one characteristic of the object and a plurality of filters, each associated with one of a plurality of interacting models representing an operating state of the object. Each of the models is defined by at least one parameter having a known bounded value. The system further includes a model probability evaluator configured to determine the likelihood said object is operating within one of said plurality of interacting models, an estimate mixer responsive to said model probability evaluator for mixing estimates generated by each of the plurality of filters, and a combiner for estimating the state of the object by combining the output of said plurality of filters.

DETAILED DESCRIPTION

Figure 1:
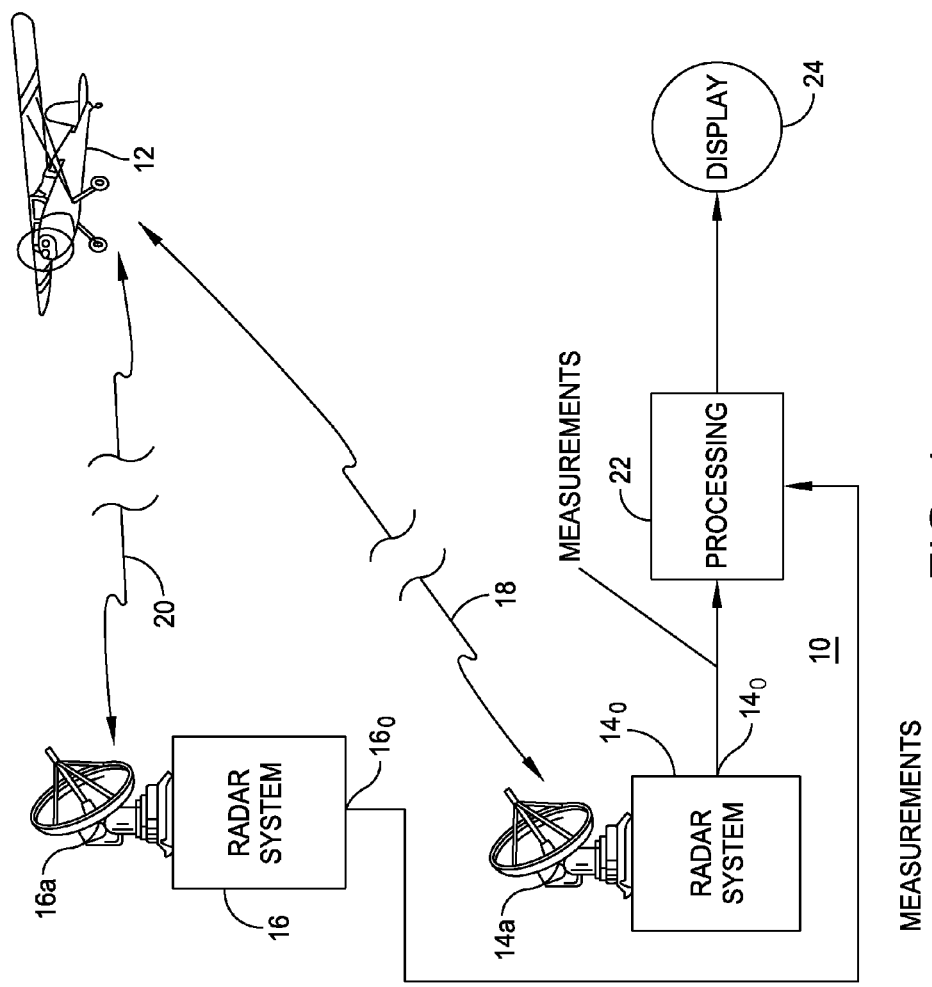
FIG. 1 is a simplified block diagram of an exemplary system for estimating the state of a target.

It is to be understood that the figures and descriptions of the present invention have been simplified to illustrate elements that are relevant for a clear understanding of the present invention, while eliminating, for purposes of clarity, many other elements found in state estimation systems, such as IMM-based state estimation systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Referring generally to FIG. 1, a simplified diagram of a target tracking system 10 is shown. System 10 may track a target, for example, an aircraft 12, transitioning back and forth between discrete models of flight (e.g. performing a direction change and continuing on a relatively linear flight path) using one or more sensors, such as a radar systems 14, 16. Radar systems 14, 16 include radar antennas 14a, 16a which transmit and subsequently receive radar signals 18, 20 reflected off target 12 and/or other background features. Returned signals 18, 20 allow the generation of measurements at output ports 14o, 16o of the radar systems. These measurements include values of at least target position, which may be in the form of range and angles (e.g. elevation and azimuth) from the radar systems. In practice, these measurements may be corrupted by unknown random measurement noises. These noises may be characterized by a covariance and unknown time-varying biases having known bounds. The biases may be the result of, for example, sensor misalignment.

The measurements from radar systems 14, 16 are applied to a processing arrangement 22 for determining various target parameters, for example, course (i.e. direction of motion), speed, and target type. The estimated position of the target, and possibly other information, is provided to a utilization apparatus, for example, a radar display 24, for interpretation by an operator. The operator (or possibly automated decision-making equipment) can make decisions as to actions to be taken in response to the displayed information.

As set forth above, existing state-estimation systems and methods have difficulty estimating the state of a system transitioning between distinct modes of operation, such as the maneuvering aircraft 12. This problem has been addressed by implementing algorithms which allow transitions from one model to another ("interacting models"). These interacting models have the advantage of reducing the filter lag and/or noise when the operating regime of the system being modeled switches from one model to another. However, estimation algorithms for such models are often burdened by computational challenges to account for the history of all possible switches, and thus experience undesirable effects, such as lag.

IMM algorithms provide a solution for transitioning between models with reduced computation. In some systems, model transitions are handled by considering interacting models transitioning from one to another according to a Markov transition matrix. The Markov assumption leads to an interaction of the elemental filters representing each model that make up the IMM estimator. As a consequence of the Markov transition process between models, the IMM mixes the state estimates from all the filters, and feeds a different mixture to every filter at the start of each computation cycle. The IMM algorithm makes use of the individual state estimates and error characterization from each elemental state estimator and reports to the external user the overall state estimate and error characterization.

IMM estimators are typically built on a bank elemental Kalman filters. Each Kalman filter is associated with a different model of the IMM (e.g. "tuned' to a different acceleration, etc.). Because each model's parameters cannot be assumed to have precisely known values, the Kalman filters use empirically-derived white process noise for system modeling. For example, a large value of process noise is used for a large acceleration, and a smaller value for a smaller acceleration. The outputs of the multiple models included in the IMM are weighted and combined according to the likelihood that a measurement fits the assumption of each of the models.

However, Kalman filter-based IMM estimators suffer from numerous drawbacks. For example, the filters must be designed for each type of model, making their implementation impractical. Further, their designs are cumbersome and often non-robust. More specifically, their implementation typically requires large amounts of empirical simulation to design the appropriate white process noise. Further still, these systems generally suffer from an inability to handle data received out-of-sequence and account for biases between multiple sensors, as well as inaccuracies in characterizing estimation errors for maneuvering objects.

Embodiments of the present invention include IMM architectures and algorithms utilizing alternative state estimation processes. More specifically, embodiments may replace existing Kalman filters and their associated processing methods with an "optimal reduced state estimation" (ORSE) IMM algorithm, in combination with elemental ORSE filters. This ORSE IMM architecture may avoid utilizing a specific system model, and instead considers the worst-case bounds for one or more input parameters of the system. These physical bounds replace the empirical white process noise utilized in the Kalman filtering operations of existing IMM state estimators, and offer improved system accuracy, as well as simplified state estimator design.

For a given system that can be represented by a plurality of models, each individual model may include both states, whose dynamics can be modeled, and extrinsic parameters, such as inputs to the system and sensor biases, whose dynamics cannot be modeled, but which extrinsic parameters are constrained to lie within a known range of values. Based on these principles, embodiments of the present invention avoid the need for the specialized filter designs of traditional IMM algorithms by analytic modeling of extrinsic parameters, for example, the physical bounds of target maneuvers as well as the sensor biases.

Exemplary ORSE IMM systems and methods according to embodiments of the present invention may perform an iterative process, wherein for a given time step, a linear combination of object (e.g. target) state estimates are input into each model. Current object measurements (e.g. from one or more sensors) are also input into each model, and residuals computed, along with likelihood functions. Normalized likelihood functions are used as weights in a linear combination of current model outputs to form the desired blended track state and covariance outputs. The residuals and model probabilities are calculated from the outputs of each model and each model's outputs are stored for the next iteration.

As set forth above, elemental ORSE filters may be used for tracking an object. In an exemplary aircraft tracking embodiment, using the physical bounds (i.e. maximum excursions) on various parameters, such as turn rate and tangential acceleration, ORSE filtering can provide for increased estimation consistency. Maximum accelerations produced by these bounded parameters, along the instantaneous normal and tangential airplane axes, bound all physically possible maneuvers. In an exemplary filter model used by an IMM of the present invention, these maximum accelerations are represented in an equivalent statistical model by, for example, a multivariate Gaussian distribution of constant accelerations, whose one-sigma ellipsoid best approximates the maximum accelerations. As a result, among all current estimators (including reduced state Kalman filters) with the same reduced states, ORSE filters utilized by IMM algorithms of embodiments of the present invention have the least covariance. This covariance is the minimal covariance achievable by linearly weighting the predicted states with a new measurement at each successive update of the filter. ORSE minimizes the mean-square and thus, the root-mean-square (RMS) estimation errors for the maximum excursions of the parameters in the truth model. Furthermore, because the bounds are included in the minimized covariance, embodiments of the present invention do not need white plant noise, as is required by Kalman filters, to cope with the reduced state.

Figure 2:
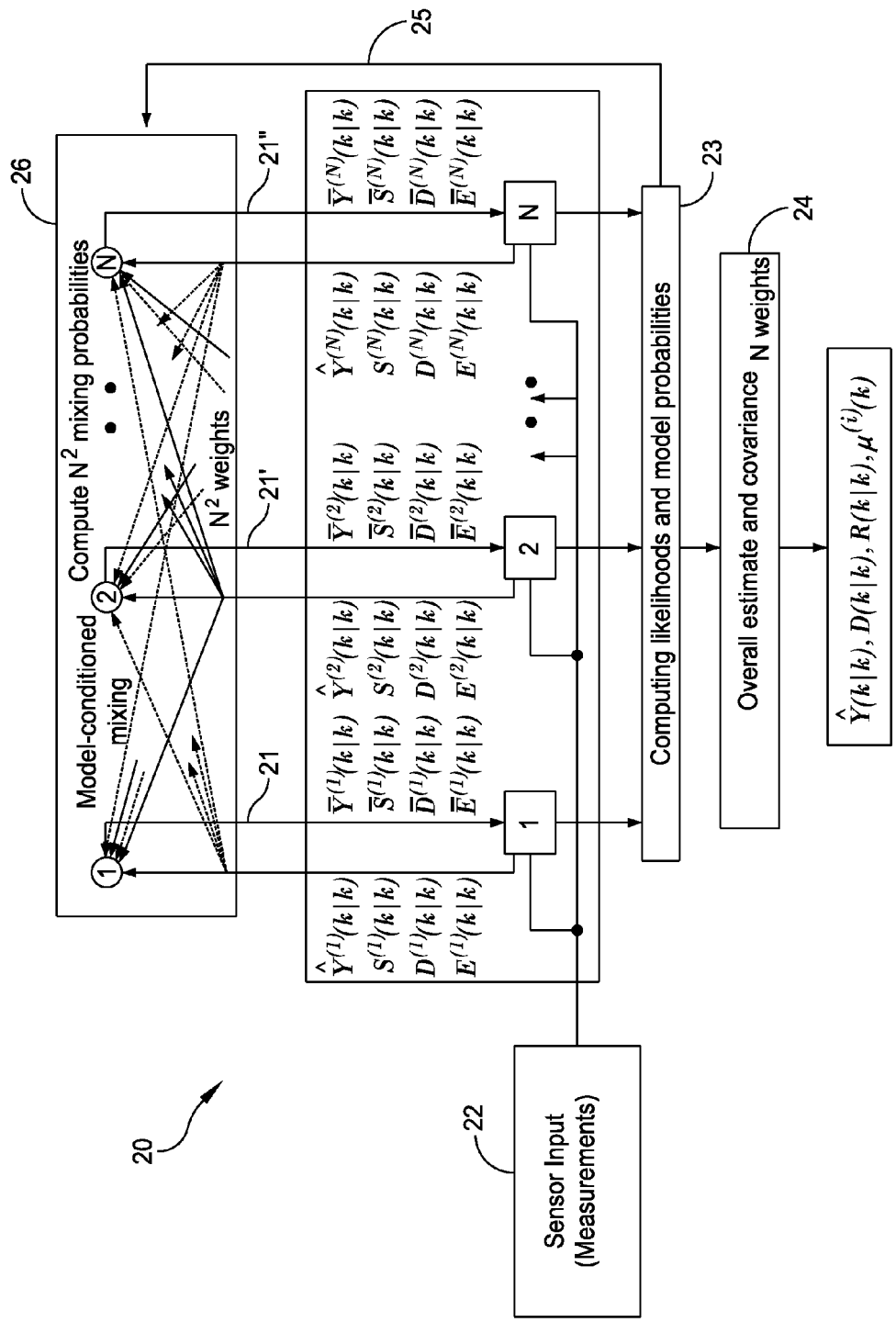
FIG. 2 is a simplified diagram illustrating a system for performing a four step recursive state estimation process according to an embodiment of the present invention which may be used in the arrangement of FIG. 1.

Referring generally to FIG. 2, an ORSE IMM system 20 according to an exemplary embodiment of the present invention generally consists of an ORSE filter 1, 2 . . . N for each model of a given system, a model probability evaluator 23, an estimate mixer 26 arranged at the input of the filters, and an estimate combiner 24 at the output of the filters. Each of the models interacts through a mixing process to track, for example, a target maneuvering with an arbitrary trajectory. More specifically, for a given time step, previous state estimates for each model 1, 2 . . . N are combined in mixer 26, to produce updated mixed state estimates 21, 21', 21", and are input into respective filters 1, 2 . . . N. The current system measurements 22 (e.g. from one or more sensors) are also input into each filter 1, 2 . . . N, and residuals computed, along with likelihood functions in probability evaluator 23. Normalized likelihood functions are used as weights in a linear combination of current model outputs to form the desired blended track state and covariance outputs in combiner 24. Each model output is stored for the next iteration, and model probabilities 25 are updated for the same.

With reference to Tables 1 and 2, and the process illustrated in FIG. 2, an exemplary ORSE IMM algorithm according to an embodiment of the present invention will be set forth in detail herein. Consider tracking a system (i.e. a target) which at any time of observation obeys one of a finite number of models $\Pi_i$, i=1, . . . , N, and has a tendency to transition to another model $\Pi_j$, j=1, . . . , N according to a Markov probability matrix whose components are $\Pi_{ij}$. Each model $\Pi_i$, i=1, . . . , N is a function of a number of arbitrarily time-varying parameters, having known bounds. The models are reduced order models of the true target and include an m-dimensional parameter vector $\lambda$ composed of the union of all these parameters over all the models. Let each model $\Pi_i$ describe the propagation of a p-dimensional state vector Y(k) of the system at the $k^{th}$ sample time $t_k$, k=1, 2, . . . of observation to the $(k+1)^{th}$ sample time $t_{k+1}$ according to the differential equation:

$$\frac{dY(t)}{dt} = f^{(i)}(Y(t), \lambda) \quad (1)$$

where the function $f^{(i)}(\bullet)$ describes the system dynamics together with initial conditions given by $Y(t_k)=Y(k)$. This function depends on model $\Pi_i$ and is a function of the arbitrarily time-varying m-dimensional parameter vector $\lambda$ with known mean $\bar{\lambda}$ and bounds represented by a m×m covariance matrix $\Lambda$. As previously stated, the m-dimensional parameter vector $\lambda$ is composed of the combination of all parameters over all models. The ORSE filters model the parameter vectors $\lambda$ as random constants with mean $\bar{\lambda}$, and covariance matrix $\Lambda$, whose one-sigma values are set equal to the maximum excursions described by the bounds.

The system is observed by a sensor, and q-dimensional measurement vectors z(k) at the $k^{th}$ sample time $t_k$ are collected according to:

$$z(k)=HY(k)+n(k)+Jb \quad (2)$$

where H is the q×p measurement selector matrix that selects the appropriate components of the states being measured at time $t_k$ for k=1, 2, 3, . . . . The q-dimensional white measurement noise n(k) has mean zero and covariance matrix N. The q×r bias selector matrix J selects the appropriate components of measurement bias. Similar to $\lambda$, the r-dimensional bias vector b has unknown time dependence, but is bounded in a symmetric region about zero. As in the case of $\lambda$, the ORSE filters model measurement biases b as random constants with mean zero, and a covariance matrix denoted as B, whose one-sigma values are set equal to the maximum excursions described by the bounds. The random vectors b, and the white noise n(k) for k=1,2,3, . . . are assumed to be mutually independent. The matrices H, J, and N are common to all models $\Pi_i$, i=1, . . . , N.

Of note, there are no states in the filter model for $\lambda$ and b. Hence, $\lambda$ and b are not estimated by the filter. They are represented in the filter only by their bounds expressed through their covariance matrices $\Lambda$ and B. In one embodiment, a multivariate Gaussian distribution may be used for $\lambda$, b, and n(k) for k=1,2,3, . . . , as only the first and second order moments of their actual distributions are involved in the mean-square criterion.

Let $\hat{Y}^{(i)}(k|k)$ denote the measurement updated state estimate provided by an ORSE filter tuned to model $\Pi_i$ at the $k^{th}$ sample time $t_k$. Also at time $t_k$, let $M^{(i)}(k|k)$ be the associated covariance of $\hat{Y}^{(i)}(k|k)$ due to measurement noise only, $D^{(i)}(k|k)$ be the associated bias coefficients at time $t_k$ due to un-modeled parameters, $E^{(i)}(k|k)$ be the associated bias coefficients at time $t_k$ due to measurement bias errors, $R^{(i)}(k|k)$ be the covariance matrix at time $t_k$ combining measurement noise and measurement bias effects only, $S^{(i)}(k|k)$ be the total covariance of $\hat{Y}^{(i)}(k|k)$ at time $t_k$, and $\mu^{(i)}(k)$ be probability that the object is in model $\Pi_i$ at time $t_k$.

Figure 3:
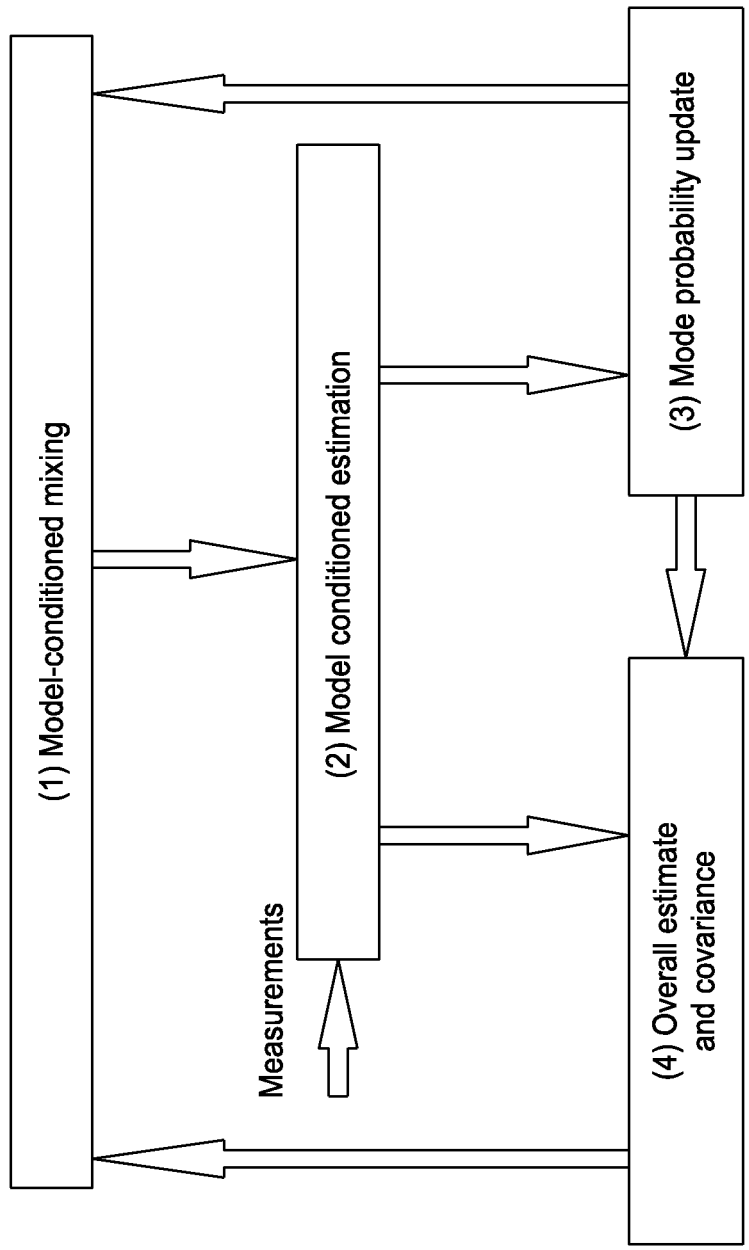
FIG. 3 is a logic flow diagram illustrating one computation cycle of a state estimation process according to an embodiment of the present invention.

FIG. 3 is a simplified flowchart illustrating an exemplary iterative four-step process of an IMM algorithm based on ORSE according to an embodiment of the present invention. The first step includes estimate or model-conditioning, wherein the previous state estimates for each of the models are blended to produce mixed state estimates. This results in a modification of the target prediction equations and accounts for model switching between the time of the last track update and the generation of the current state data. A model mixing probability $\mu^{i/j}$ is computed, representing the probability that the target was in model i for the previous scan, given that it is now in model j. This probability is used to construct the mixed state estimate and mixed covariance estimate for each model j (see Table 1). An exemplary algorithm is set forth in detail below.

Step 1: Model-Conditioned Mixing $$\bar{\mu}^{(j)}(k) = \sum_i \mu^{(i)}(k)\pi_{ij} \quad (3)$$

$$\mu^{i|j}(k) = \mu^{(i)}(k)\pi_{ij}/\bar{\mu}^{(j)}(k) \quad (4)$$

$$\tilde{Y}^{(i)}(k|k) = \sum_j \mu^{j|i}(k)\hat{Y}^{(j)}(k|k) \quad (5)$$

$$\delta^{j|i} = \hat{Y}^{(j)}(k|k) - \tilde{Y}^{(i)}(k|k) \quad (6)$$

$$\tilde{S}^{(i)}(k|k) = \sum_j \mu^{j|i}(k)[S^{(j)}(k|k) + (\delta^{j|i})(\delta^{j|i})'] \quad (7)$$

$$\tilde{D}^{(i)}(k|k) = \sum_j \mu^{j|i}(k) D^{(j)}(k|k) \qquad (8)$$

$$\tilde{E}^{(i)}(k|k) = \sum_j \mu^{j|i}(k) E^{(j)}(k|k) \qquad (9)$$

$$\tilde{M}^{(i)}(k|k) = \tilde{S}^{(i)}(k|k) - \tilde{D}^{(i)}(k|k)\Lambda\tilde{D}^{(i)}(k|k)' - \tilde{E}^{(i)}(k|k)B\tilde{E}^{(i)}(k|k)' \qquad (10)$$

The size of the mixed vector $\overline{Y}^{(j)}(k|k)$ in equation (5) is p×1. The size of the mixed matrix $\tilde{S}^{(i)}(k|k)$ in equation (7) is p×p. The size of the mixed matrix $\tilde{D}^{(i)}(k|k)$ in equation (8) is p×m. The size of the mixed matrix $\tilde{E}^{(i)}(k|k)$ in equation (9) is p×r. The size of the mixed matrix $\tilde{M}^{(i)}(k|k)$ in equation (10) is p×p.

Thus, the state vectors of all models used in the exemplary IMM are all considered to be of dimension p. Let the accelerating models be the first N-1 models. Let the non-accelerating model be the $N^{th}$ model. For this non-accelerating model, the dimension d(d<p) of the state vector is increased to the dimension p of the state vector of the accelerating models by zero padding. A matrix γ given by:

$$\delta = \begin{bmatrix} I_{d \times d} & 0_{d \times h} \\ 0_{h \times d} & 0_{h \times h} \end{bmatrix} \qquad (11)$$

where h=p−d is applied to the mixed state vector and matrices for the $N^{th}$ model as follows:

$$\overline{Y}^{(i)}(k|k) = \gamma \tilde{\overline{Y}}^{(i)}(k|k) \qquad (12)$$

$$\overline{D}^{(i)}(k|k) = \gamma \tilde{\overline{D}}^{(i)}(k|k) \qquad (13)$$

$$\overline{E}^{(i)}(k|k) = \gamma \tilde{\overline{E}}^{(i)}(k|k) \qquad (14)$$

$$\overline{M}^{(i)}(k|k) = \gamma \tilde{\overline{M}}^{(i)}(k|k) \gamma' \qquad (15)$$

to convert these matrices for the non-accelerating model (because the non-accelerating model is zero-padded). Whereas, for the N-1 accelerating models, the mixed state vector and matrices are unchanged from their expressions above:

$$\overline{Y}^{(i)}(k|k) = \tilde{\overline{Y}}^{(i)}(k|k) \qquad (16)$$

$$\overline{D}^{(i)}(k|k) = \tilde{\overline{D}}^{(i)}(k|k) \qquad (17)$$

$$\overline{E}^{(i)}(k|k) = \tilde{\overline{E}}^{(i)}(k|k) \qquad (18)$$

$$\overline{M}^{(i)}(k|k) = \tilde{\overline{M}}^{(i)}(k|k) \qquad (19)$$

The second step in the exemplary IMM ORSE process includes model condition estimation using the ORSE bounded filters (e.g. filters 1, 2 ... N in FIG. 2). Exemplary ORSE filters are used to produce target state estimates conditioned on the target models, including time updates, gain computations, and measurement updates. An exemplary ORSE filter algorithm is provided below.

Step 2: Model-Conditioned Estimation Time Updating $$\frac{d\hat{Y}^{(i)}(t)}{dt} = f^{(i)}(\hat{Y}^{(i)}(t), \overline{\lambda}) \qquad (20)$$

$$\frac{dF^{(i)}(t)}{dt} = \frac{\partial f^{(i)}}{\partial \hat{Y}}(\hat{Y}^{(i)}(t), \overline{\lambda}) F^{(i)}(t)$$

$$\frac{dG^{(i)}(t)}{dt} = \frac{\partial f^{(i)}}{\partial \hat{Y}}(\hat{Y}^{(i)}(t), \overline{\lambda}) G^{(i)}(t) + \frac{\partial f^{(i)}}{\partial \overline{\lambda}}(\hat{Y}^{(i)}(t), \overline{\lambda})$$

This equation is a coupled differential equation for the time duration $t_k \leq t \leq t_{k+1}$ where the function f(•) describes the system dynamics together with initial conditions given by $\hat{Y}^{(i)}(t_k) = \overline{Y}^{(i)}(k|k)$, and $$F^{(i)}(t_k) = I; \; G^{(i)}(t_k) = 0 \qquad (21)$$

where I is the identity matrix.

These partial derivatives $$\frac{\partial f^{(i)}}{\partial \hat{Y}}(\hat{Y}^{(i)}(t), \overline{\lambda})$$

and $$\frac{\partial f^{(i)}}{\partial \overline{\lambda}}(\hat{Y}^{(i)}(t), \overline{\lambda})$$

are evaluated at $\hat{Y}^{(i)}(t_k) = \overline{Y}^{(i)}(k|k)$ and $\lambda = \overline{\lambda}$. Here $\overline{Y}^{(i)}(k|k)$ is the mixed state estimate at time $t_k$ using the model i (see equations (12)-(19) in Step 1). The integration of equation (20) yields the time updated state vector estimate $\hat{Y}^{(i)}(t_{k+1})$ and the system matrices $F^{(i)}$ and $G^{(i)}$ for the time duration $t_k \leq t \leq t_{k+1}$. The estimated state vector and associated matrices are then time updated as follows:

$$\hat{Y}^{(i)}(k+1|k) = \hat{Y}^{(i)}(t_{k+1}) \qquad (22)$$

$$M^{(i)}(k+1|k) = F^{(i)} \overline{M}^{(i)}(k|k) F^{(i)'} \qquad (23)$$

$$D^{(i)}(k+1|k) = F^{(i)} \overline{D}^{(i)}(k|k) + G^{(i)} \qquad (24)$$

$$E^{(i)}(k+1|k) = F^{(i)} \overline{E}^{(i)}(k|k) \qquad (25)$$

Next the gains $K^{(i)}$ for the $i^{th}$ filter are computed:

$$P^{(i)} \stackrel{def}{=} M^{(i)}(k+1|k) + D^{(i)}(k+1|k) \Lambda D^{(i)}(k+1|k)' \qquad (26)$$

$$V^{(i)} \stackrel{def}{=} HE^{(i)}(k+1|k) + J \qquad (27)$$

$$U^{(i)} \stackrel{def}{=} P^{(i)} H' + E^{(i)}(k+1|k) B V^{(i)'} \qquad (28)$$

$$Q^{(i)} = HP^{(i)} H' + V^{(i)} B V^{(i)'} + N \qquad (29)$$

$$K^{(i)} = U^{(i)} (Q^{(i)})^{-1} \qquad (30)$$

Finally, the estimated state vector and associated matrices are measurement updated as follows:

$$\zeta^{(i)}(k+1) = z(k+1) - H\hat{Y}^{(i)}(k+1|k) \qquad (31)$$

$$\hat{Y}^{(i)}(k+1|k+1) = \hat{Y}^{(i)}(k+1|k) + K^{(i)} \zeta^{(i)}(k+1) \qquad (32)$$

$$L^{(i)} = I_{n \times n} - K^{(i)} H \qquad (33)$$

$$D^{(i)}(k+1|k+1) = L^{(i)} D^{(i)}(k+1|k) \qquad (34)$$

$$E^{(i)}(k+1|k+1) = E^{(i)}(k+1|k) - K^{(i)} V^{(i)} \qquad (35)$$

$$M^{(i)}(k+1|k+1) = L^{(i)} M^{(i)}(k+1|k) L^{(i)'} + K^{(i)} N K^{(i)'} \qquad (36)$$

$$S^{(i)}(k+1 \mid k+1) = \quad (37)$$
$$M^{(i)}(k+1 \mid k+1) + D^{(i)}(k+1 \mid k+1)\Lambda D^{(i)}(k+1 \mid k+1)' +$$
$$E^{(i)}(k+1 \mid k+1) B E^{(i)}(k+1 \mid k+1)'$$

Once the next-iteration target state estimates are produced (i.e. each model updated), new model probabilities (equation 39) are computed according to a model likelihood function (equation 38).

Step 3: Model Probability Update (the Notation |A| Denotes the Determinant of the Matrix A)

$$\eta^{(i)}(k+1) = N(\zeta^{(i)}(k+1) \mid 0, Q^{(i)}) = \quad (38)$$
$$|2\pi Q^{(i)}|^{-1/2} \exp\left\{ -\frac{\zeta^{(i)}(k+1)'(Q^{(i)})^{-1}\zeta^{(i)}(k+1)}{2} \right\}$$

$$\mu^{(i)}(k+1) = \frac{\bar{\mu}^{(i)}(k)\eta^{(i)}(k+1)}{\sum_j \bar{\mu}^{(j)}(k)\eta^{(j)}(k+1)} \quad (39)$$

Finally, overall state estimates, covariance of the state estimation error, and bias coefficients for each of the models may be combined using the updated model probability weights computed above.

Step 4: Overall Estimate and Covariance $$\hat{Y}(k+1 \mid k+1) = \sum_i \mu^{(i)}(k+1)\hat{Y}^{(i)}(k+1 \mid k+1) \quad (40)$$

$$\delta^{(i)} = \hat{Y}^{(i)}(k+1 \mid k+1) - \hat{Y}(k+1 \mid k+1) \quad (41)$$

$$S(k+1 \mid k+1) = \sum_i \mu^{(i)}(k+1)[S^{(i)}(k+1 \mid k+1) + (\delta^{(i)})(\delta^{(i)})'] \quad (42)$$

$$D(k+1 \mid k+1) = \sum_i \mu^{(i)}(k+1) D^{(i)}(k+1 \mid k+1) \quad (43)$$

$$E(k+1 \mid k+1) = \sum_i \mu^{(i)}(k+1) E^{(i)}(k+1 \mid k+1) \quad (44)$$

$$R(k+1 \mid k+1) = S(k+1 \mid k+1) - D(k+1 \mid k+1)\Lambda D(k+1 \mid k+1)' \quad (45)$$

In one embodiment of the present invention, the outputs to the user of the algorithm are the state estimate $\hat{Y}(k+1 \mid k+1)$ (equation (40)), the matrix of combined model bias coefficients $D(k+1 \mid k+1)$ (equation (43)) and the covariance matrix $R(k+1 \mid k+1)$ (equation (45)) containing measurement noise and bias effects only, and the model probabilities $\mu^{(i)}(k+1)$ (equation (39)). Note that $\mu^{(i)}(k+1)$, $S^{(i)}(k+1 \mid k+1)$, $D^{(i)}(k+1 \mid k+1)$, and $E^{(i)}(k+1 \mid k+1)$ are maintained (i.e. stored) and used as an input to the next computation cycle. However, $\hat{Y}(k+1 \mid k+1)$, $D(k+1 \mid k+1)$, and $R(k+1 \mid k+1)$ are not utilized in subsequent cycles.

TABLE 1

Definition of inputs to ORSE IMM computation cycle

| | |
|---|---|
| $\pi_{ij}$ | Markov transition probabilities from model i to model j |
| $\mu^{(j)}(k)$ | Probability that the tracked object is in model j at time $t_k$ |
| $\hat{Y}^{(j)}(k \mid k)$ | State estimate at time $t_k$ after updating k measurements using the model j |
| z(k) | Measurement at time $t_k$ |
| $S^{(j)}(k \mid k)$ | Total covariance of state estimate at time $t_k$ after updating k measurements using the model j |
| $D^{(j)}(k \mid k)$ | Bias coefficients at time $t_k$ after updating k measurements due to parameter excursions only using the model j |
| $E^{(j)}(k \mid k)$ | Bias coefficients at time $t_k$ after updating k measurements due to measurement bias errors only using the model j |
| N | Measurement noise covariance |
| B | Measurement bias covariance |
| Λ | Parameter covariance used for all models |

TABLE 2

Definition of outputs of ORSE IMM computation cycle

| | |
|---|---|
| $\mu^{(j)}(k+1)$ | Probability that the tracked object is in model j at time $t_{k+1}$ |
| $\hat{Y}(k+1 \mid k+1)$ | State estimate at time $t_{k+1}$ after updating k + 1 measurements |
| $D(k+1 \mid k+1)$ | Bias coefficients at time $t_{k+1}$ after updating k + 1 measurements due to parameter excursions |
| $R(k+1 \mid k+1)$ | Covariance matrix containing measurement noise and bias effects only at time $t_{k+1}$ after updating k + 1 measurements |

Filtering based on the ORSE designs described herein provides consistency and optimality previously lacking in tracking filters, thus promoting better filter performance in the presence of model variations and biased measurements. Thus, IMM architectures using elemental ORSE filters instead of Kalman filters brings forth the consistent and optimal properties of ORSE into adaptive state estimation.

Processing system 22 (FIG. 1), including the above-described ORSE filters, probability evaluators, mixers and combiners are described and illustrated herein only as exemplary systems for performing the described ORSE IMM state estimation processes, and other embodiments may be contemplated by one of skill in the pertinent art without departing from the intended scope of this disclosure. More generally, the process or processes explained herein may be performed by one or more processors, which processors access a memory device, the memory device containing instructions, which instructions, when executed by the processors, cause the steps of a method for state estimation to be performed by the processors. It is understood that the processes may also be performed by special-purpose hardware. Thus, the entire process, or any part thereof, may be performed in hardware, software or any combination of hardware and/or software. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method for estimating the state of an object, the method comprising the steps of:
   providing a plurality of interacting models, each model representing a potential operating mode of the object and defined by at least one extrinsic parameter constrained to lie within a predetermined range of values;
   making measurements of at least one aspect of the state of the object with at least one sensor;
   using at least one processor responsive to the output of the sensor:
      calculating mixed estimates of the state of the object and their mixed covariances;
      predicting the mixed estimates and the mixed covariances of each of the plurality of models to the time of the measurement of the at least one aspect of the state of the object;
      computing filter gains for each of the plurality of models according to the predicted mixed estimates and mixed covariances;
      processing the measurements of the at least one aspect of the state of the object in each model, yielding a measurement-updated object state and covariance for each model;
      calculating model probabilities from the measurement-updated state and covariance; and
      generating an overall estimate of the state and covariance of the object from the model-conditioned updated states, model-conditioned covariances, and model probabilities.

2. The method according to claim 1, wherein the at least one extrinsic parameter includes an unknown input parameter to the system describing the object.

3. The method according to claim 1, wherein the at least one extrinsic parameter includes an unknown sensor bias parameter.

4. The method according to claim 1, wherein the at least one extrinsic parameter includes at least one unknown extrinsic parameter of the object and an extrinsic sensor bias parameter.

5. The method according to claim 1, further comprising the step of minimizing the mean-square estimation error of the object state.

6. The method according to claim 1, wherein the object is a system, and the interacting models include models of position and covariance with a probability of transitioning from one model to another model expressed by Markov transition rates.

7. The method according to claim 1, wherein the step of making measurements of at least one aspect of the state of the object includes assembling covariance information from the measurements, and observing the time that the measurements are made.

8. The method according to claim 1, wherein the step of calculating mixed estimates of the state of the object and their mixed covariances includes calculating mixing probabilities and mixing weights.

9. A system for estimating the state of an object comprising:
   a sensor for measuring at least one characteristic of the object;
   a plurality of filters, each filter associated with one of a plurality of interacting models representing an operating mode of the object, the models defined by at least one extrinsic parameter having a known bounded value;
   a model probability evaluator configured to determine the likelihood the object is operating within one of the plurality of interacting models;
   an estimate mixer responsive to the model probability evaluator for mixing estimates generated by each of the plurality of filters; and
   a combiner for estimating the state of the object by combining the output of the plurality of filters.

10. The system of claim 9, further comprising a processor for minimizing the mean-square estimation error of the object's state for each model.

11. The system of claim 9, wherein the at least one extrinsic parameter includes at least one unknown extrinsic parameter of the object and an extrinsic sensor bias parameter, and wherein the system further comprises a processor for minimizing the mean-square estimation error of the object's state for each model.

12. A method for estimating the state of an object, the method comprising the steps of:
   providing a plurality of interacting models, each model representing a potential operating mode of the object and defined by at least one extrinsic parameter constrained to lie within a predetermined range of values;
   making measurements of at least one aspect of the state of the object with at least one sensor,
   using at least one processor responsive to output of the at least one sensor:
      inputting a linear combination of object state estimates into each model;
      inputting the measurements of the at least one aspect of the state of the object into each model;
      computing residuals and model probabilities from the outputs of each model;
      generating overall object state and covariance estimates by combining the outputs of each of the models;
      updating the model probabilities, and
      storing the output of each model and the updated model probabilities into memory.

13. The method of claim 12, wherein the step of computing residuals and model probabilities from the outputs of each model further comprises computing likelihood functions.

14. The method of claim 13, wherein the step of generating overall object state and covariance estimates by combining the outputs of each of the models includes applying weights generated by normalizing the computed likelihood functions.

15. The method according to claim 1, further comprising the step of repeating the steps of making measurements, calculating mixed estimates, predicting the mixed estimates, computing filter gains, processing the measurements, calculating model probabilities and generating an overall estimate of the state and covariance of the object until the at least one aspect of the state of the object is no longer measured by the at least one sensor.

16. The method of claim 12, further comprising the step of repeating the steps of making measurements, inputting linear combinations of object state estimates, inputting object state measurements, computing residuals and model probabilities, and generating an overall estimate of the state and covariance of the object until the at least one aspect of the state of the object is no longer measured by the at least one sensor.

\* \* \* \* \*